UNITED STATES PATENT OFFICE.

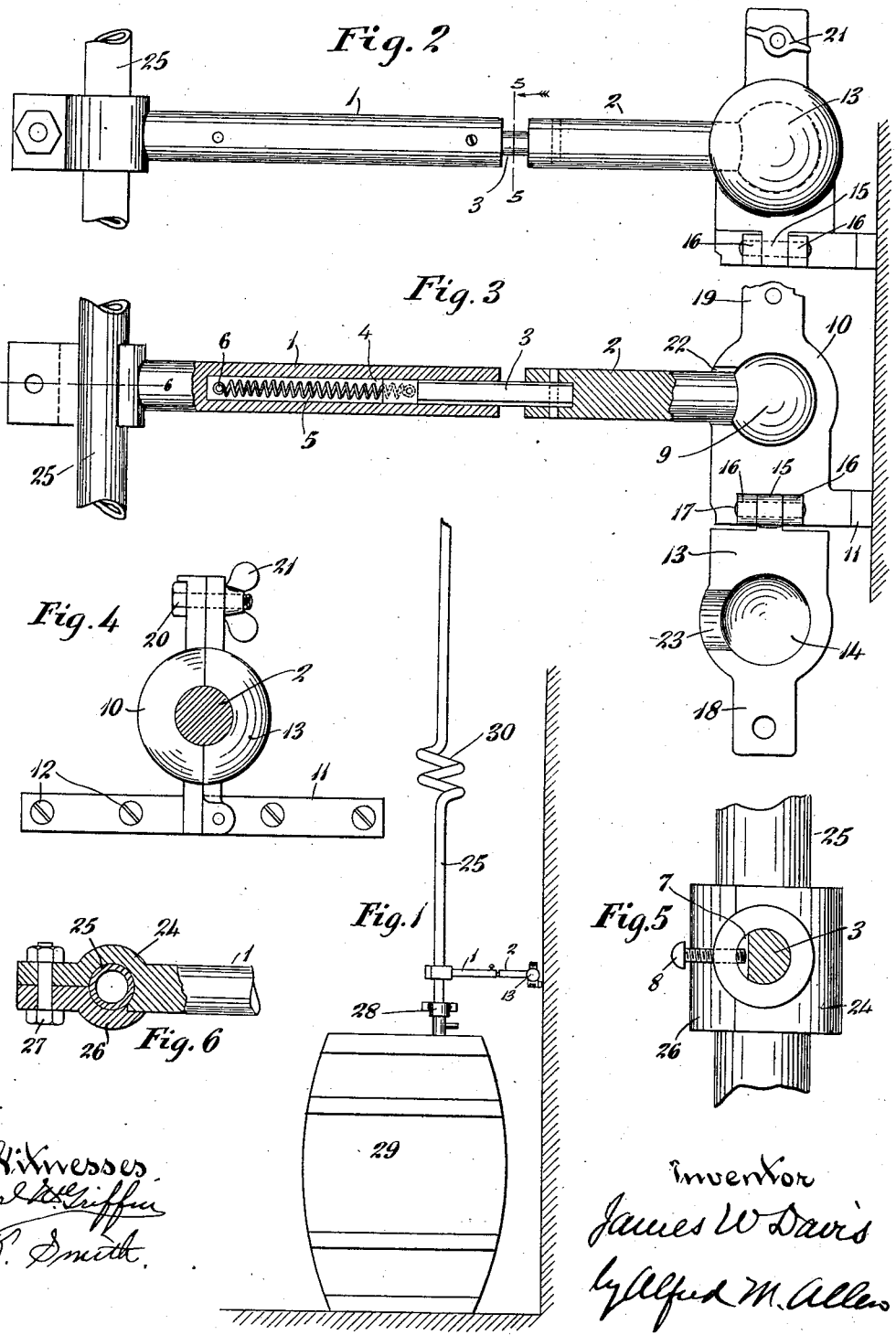

JAMES W. DAVIS, OF CINCINNATI, OHIO.

HOLDER FOR FAUCET-PIPES.

1,012,063.   Specification of Letters Patent.   Patented Dec. 19, 1911.

Application filed March 29, 1911. Serial No. 617,763.

*To all whom it may concern:*

Be it known that I, JAMES W. DAVIS, a citizen of the United States, and a resident of the city of Cincinnati, in the county of Hamilton and State of Ohio, have invented certain new and useful Improvements in Holders for Faucet-Pipes, of which the following is a full, clear, and exact description, reference being had to the accompanying drawings, forming a part of this specification.

The object of my invention is to provide a construction for protecting and holding the faucet pipes which are provided for supplying beer and the like from the keg or barrel in the cellar or ice cooler to the faucet, with which the very objectionable use of a rubber hose connection now almost universally employed to connect the end of the faucet pipe with the tap in the barrel, is entirely avoided.

Beer pipes for connecting the faucet at the bar with the keg or barrel are usually constructed of tin, and by reason of the expense, such pipes are usually quite light and thin and are liable to become dented and bent out of shape with hard or careless usage. In locating the barrels or kegs, the ends of these pipes are consequently arranged some distance from the tap into the barrel, in order to prevent striking or injuring the end of the pipe in locating the barrel, and the connection is made between the end of the pipe and the barrel tap with a section of rubber hose. The use of this rubber hose is very objectionable. The rubber affects the taste of the beer, and when the beer pipes are flushed out with steam, as is frequently the case, the steam cooks the rubber and bakes the sediment in the hose. The beer drawn through such a hose tastes of the burned rubber, especially where the beer is allowed to remain in the hose without constantly tapping, and as the beer is forced from the keg by compressed gas, the two joints of the hose are very apt to leak. Also with the use of rubber hose, it is impossible to maintain the low temperature that could be maintained with a metal pipe from keg to faucet. With the ordinary rough usage incident to the class of labor employed, it has been found impracticable to dispense with the hose connection, however, without liability of too great damage to the end of the beer pipe in adjusting the keg in proper position and bending of the pipe to make a direct metal coupling. It is to overcome these difficulties and to permit the user to dispense with the rubber hose connection that my invention is directed, and it consists of that novel construction and arrangement of adjustable bracket arm for holding the end of the beer pipe so as to prevent damage and serve as a guard for the otherwise loose end of the pipe, at the same time that sufficient play is provided for making the direct metal coupling of the end of the pipe with the tap in the barrel, without permitting the pipe to be moved to such an extent as to cause damage.

In the drawings, Figure 1 is a side elevation of my improved construction showing the barrel and a length of the faucet pipe. Fig. 2 is a side elevation of the adjustable bracket in use. Fig. 3 is a similar view, partly in longitudinal section, with the holding caps for the bracket arm removed. Fig. 4 is a cross section of the bracket arm. Fig. 5 is a cross section, taken on the lines 5, 5, of Fig. 2. Fig. 6 is a horizontal section of the outer end of the bracket arm, taken on the lines 6, 6, of Fig. 3.

The bracket arm is preferably divided into two parts 1 and 2, and connected together by the rod 3, which is pinned or otherwise secured to the arm 2, and which projects into and is seated in a socket 4 in the arm 1. A coiled spring 5 is located in the inner portion of this socket recess, secured at one end by the pin 6 to the arm and at the other end secured to the rod 3, so that normally, when in use, the arm 1 will be drawn up close to and form a continuation of the arm 2. The rod 3 is cut away or flattened at 7, leaving a cylindrical head at the outer end, and 8 is a set screw to engage this flat surface and prevent the separation of the two parts of the bracket arm, while permitting the bracket arm to be elongated within the limits of the length of the projecting end of the rod 3.

The bracket arm is secured to the wall or other suitable support by a ball and socket joint construction. The inner end of the arm 2 is provided with a spherical head 9, which is seated in a semi-spherical recess in the socket plate 10, which plate is provided with a base piece 11 extending laterally and at right angles to the socket plate. This base plate is secured to the wall by the screws 12.

To hold the joint in place, I provide a cap plate 13, provided with the semi-spherical recess 14, to fit over the head 9, and this cap plate is hinged to the socket plate by the apertured lug 15 on the cap plate which is inserted between the ears 16 on the socket plate, with the pintle 17 to hinge the parts together. Both the socket plate and cap plate have extensions 18, 19, which fit together, and are secured by the bolt 20, with winged nut 21. The recesses in the plates are of such a size that by tightening the winged nut 21, the spherical head 9 will be clamped tightly in position. The side opening 22 in the socket plate, and 23 in the cap, through which the arm 2 projects, are formed of sufficient diameter to allow an angular adjustment of the bracket arm of about twenty degrees.

The outer end of the bracket arm 1 is provided with the head 24, open on one side, and formed with the recess to partially engage the faucet pipe 25. When adjusted, the head is closed by the clamp plate 26, secured in position by the bolt and nut 27.

It will be understood from the foregoing description, that the bracket arm can be secured to the wall in such position as to hold the lower end of the beer pipe, and when the winged nut 21 is tightened, the arm will be rigid in position to guard and protect the end of the pipe from being struck or bent in locating and removing the barrels. It will also be understood that the bracket arm can only be drawn out or extended to the extent of a few inches, and that the angle of adjustment of the bracket arm is limited. These adjustments are sufficient to permit the movement of the beer pipe to make the coupling connection with the faucet tap 28 in the barrel 29, but not sufficient to permit any movement liable to injure the pipe. In order that the pipe itself may be more readily moved within these limits, I prefer to form a coil 30 in the pipe, as it will be obvious that the pipe can be more readily adjusted into proper position to make direct connections with the tap in the barrel by reason of this coiled construction.

In using the device, the socket plate is secured to the wall in proper position to hold the end of the pipe about six inches above the height of the barrel, and when not in use the winged nut 21 is released and the bracket arm pushed to one side and upwardly within the limits of its movement, and the winged nut is then tightened to hold the bracket in this position. In this position, the ends of the two parts of the arm will be drawn together by the coiled spring. When a keg is located under the pipe, in order to make the connection, the winged nut 21 is released, and the pipe brought into proper position within the limits of its movement in the socket plate, and by extending the arm 1. The movement being limited, there is no danger of denting or improperly bending the pipe by this adjustment, and the coupling can then be made directly on the end of the pipe.

Having thus described my invention, what I claim as new and desire to secure by Letters Patent, is:—

1. A holder for faucet pipes, comprising a bracket arm, with clamp at one end for embracing the pipe, and a plate, for securing the arm to a fixed support, at the other, with a universal hinge joint between the supporting plate and the arm, with means for limiting the movement of the arm and means for clamping the joint in fixed position, the arm divided into two sections, with means for extending one of the sections under spring tension.

2. A holder for faucet pipes, comprising a bracket arm, with clamp at one end for embracing the pipe, and a plate, for securing the arm to a fixed support, at the other, the plate provided with a socket and a spherical head on the arm seated in said socket with cap plate to hold the head in place and to clamp the head in fixed position when tightened, the socket and cap plates having an opening for the passage of the arm contracted to allow only a limited movement, the arm divided into two sections, with means for extending one of the sections under spring tension.

JAMES W. DAVIS.

Witnesses:
 CHARLES W. HOFFMAN,
 K. SMITH.

---

Copies of this patent may be obtained for five cents each, by addressing the "Commissioner of Patents, Washington, D. C."